(12) United States Patent
Geaghan et al.

(10) Patent No.: US 7,298,367 B2
(45) Date of Patent: Nov. 20, 2007

(54) LIGHT EMITTING STYLUS AND USER INPUT DEVICE USING SAME

(75) Inventors: Bernard O. Geaghan, Salem, NH (US); Michael J. Robrecht, Milwuakee, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 517 days.

(21) Appl. No.: 10/721,685

(22) Filed: Nov. 25, 2003

(65) Prior Publication Data

US 2005/0110781 A1    May 26, 2005

(51) Int. Cl.
    *G06F 3/037* (2006.01)
(52) U.S. Cl. .............. 345/180; 345/179; 178/18.03
(58) Field of Classification Search ................ 345/173, 345/179–182; 178/18.01, 18.03, 18.04, 19.01, 178/19.03
    See application file for complete search history.

(56) References Cited

U.S. PATENT DOCUMENTS

| | | | |
|---|---|---|---|
| 3,772,465 A * | 11/1973 | Vlahos et al. ............. 382/167 |
| 4,320,292 A | 3/1982 | Oikawa et al. |
| 4,705,942 A * | 11/1987 | Budrikis et al. ....... 250/227.13 |
| 4,794,634 A | 12/1988 | Torihata et al. |
| 4,800,257 A | 1/1989 | Johner |
| 5,484,966 A | 1/1996 | Segen |
| 5,502,514 A * | 3/1996 | Vogeley et al. ............. 348/771 |
| 5,514,861 A | 5/1996 | Swartz et al. |
| 5,600,348 A | 2/1997 | Bartholow et al. |
| 5,838,308 A | 11/1998 | Knapp et al. |
| 5,959,617 A | 9/1999 | Bird et al. |
| 6,133,906 A * | 10/2000 | Geaghan ...................... 345/179 |
| 6,151,015 A | 11/2000 | Badyal et al. |
| 6,172,668 B1 | 1/2001 | Baur |
| 6,337,918 B1 | 1/2002 | Holehan |
| 6,377,249 B1 | 4/2002 | Mumford |
| 6,404,416 B1 | 6/2002 | Kahn et al. |
| 6,700,129 B1 * | 3/2004 | Usuda et al. .......... 250/559.29 |
| 2002/0097232 A1 | 7/2002 | Pogatetz et al. |

(Continued)

FOREIGN PATENT DOCUMENTS

GB    2 299 856    10/1996

(Continued)

OTHER PUBLICATIONS

Robinson, Scott and Nguyen, Tim, "Active Matrix LCD with Integrated Optical Touch Screen", SID 03 Digest, 56.3.

*Primary Examiner*—Richard Hjerpe
*Assistant Examiner*—Kimnhung Nguyen

(57) ABSTRACT

The present invention provides a user input device that includes and array of light detectors and a light emitting stylus configured to emit a beam of light detectable by the light detectors. The light beam is wide enough at the plane of the detectors so that at least two detectors are illuminated for all positions of interest. This allows the light beam position to be interpolated to obtain positional resolution that is greater than would be expected simply due to the spacing between detectors. Interpolation can be further aided by using a light beam that has a known variance in cross-sectional intensity. The present invention also provides for determining the orientation of the stylus by comparing the detected shape of the light beam cross-section to the known shape of the light beam cross-section.

13 Claims, 10 Drawing Sheets

U.S. PATENT DOCUMENTS

| | | | |
|---|---|---|---|
| 2003/0095708 | A1 | 5/2003 | Pittel |
| 2003/0179323 | A1* | 9/2003 | Abileah et al. ............... 349/24 |
| 2004/0071066 | A1* | 4/2004 | Valley et al. ............ 369/53.27 |
| 2005/0237313 | A1 | 10/2005 | Yoshida |
| 2005/0264523 | A1 | 12/2005 | Yoshida et al. |
| 2006/0170658 | A1 | 8/2006 | Nakamura et al. |

FOREIGN PATENT DOCUMENTS

| | | |
|---|---|---|
| JP | 58-086674 | 5/1983 |
| JP | 60-198630 | 10/1985 |
| JP | 60-200388 | 10/1985 |
| JP | 61-006729 | 1/1986 |
| JP | 61-075423 | 4/1986 |
| JP | 61-122738 | 6/1986 |
| JP | 62-092021 | 4/1987 |
| JP | 63-082511 | 4/1988 |
| JP | 63-184823 | 7/1988 |
| JP | 7-028584 | 1/1995 |
| JP | 8-137597 | 5/1996 |
| JP | 8-194573 | 7/1996 |
| JP | 10-187348 | 7/1998 |
| JP | 10-283113 | 10/1998 |
| JP | 11-282628 | 10/1999 |
| JP | 2003-66417 | 3/2003 |
| WO | WO 02/069247 | 9/2002 |
| WO | WO 2003-058588 A2 | 7/2003 |
| WO | WO 2003-058588 A3 | 7/2003 |
| WO | WO 2003-071345 | 8/2003 |

\* cited by examiner

LIGHT EMITTING STYLUS AND USER INPUT DEVICE USING SAME

This invention relates to a light emitting stylus and the use of a light emitting stylus in a user input device.

BACKGROUND

Touch sensors have become an increasingly common way for users to intuitively interact with electronic systems, typically those that include displays for viewing information. In many applications, the information is viewed through the touch-sensitive area so that the user seems to interact directly with the displayed information. Depending on the technology of the input device, a user may interact with the device using a finger or some other touch implement such as a stylus. When a stylus is used, it can be a passive object (as is typical for those used with resistive touch screens, for example in a personal digital assistant or other hand-held device) or an active object (as is typical for those used with signature capture devices). An active stylus can communicate signals with the input device, whether sending, receiving, or both, to determine touch position or other information. Active styli include those that send or receive radio frequency signals (RF pens), those that use magnetic fields for inductive signal capture (inductive pens), and those that emit or receive light (light pens).

SUMMARY OF THE INVENTION

The present invention provides a light-sensitive user input device that includes a co-planar array of light-sensitive devices disposed to sense light transmitted through an input surface of the input device, nearest adjacent light-sensitive devices having a center-to-center spacing that is no more than a maximum distance, and a stylus configured to emit a light beam detectable by the devices, the light beam exhibiting a cross-sectional profile having a known shape characterized by an intensity variance across the beam profile. The light beam exhibits a size at the plane of the devices that is greater than the maximum distance when the stylus is contacting the input surface. The input device also includes electronics coupled to the devices and configured to determine the position of the light beam to within a spacing that is less than the maximum distance.

The present invention further provides a method of determining the position of a light beam at an input surface. The method includes providing a co-planar array of light-sensitive devices disposed to sense light transmitted through the input surface, emitting the light beam with a known shape characterized by a cross-sectional profile having a known intensity variance, the light beam having a spot size sufficient for the light beam to be detected by at least two of the light-sensitive devices when the light beam is directed through the input surface. The method also includes detecting the light beam by at least two of the light-sensitive devices, and determining the position of the light beam to an accuracy that is less than the center-to-center distance between nearest adjacent light-sensitive devices by interpolating signals measured during the detecting step using the known intensity variance of the light beam.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings where the use of identical reference numerals in different Figures denotes substantially the same, but not necessarily identical element, and in which.

Figure 1:
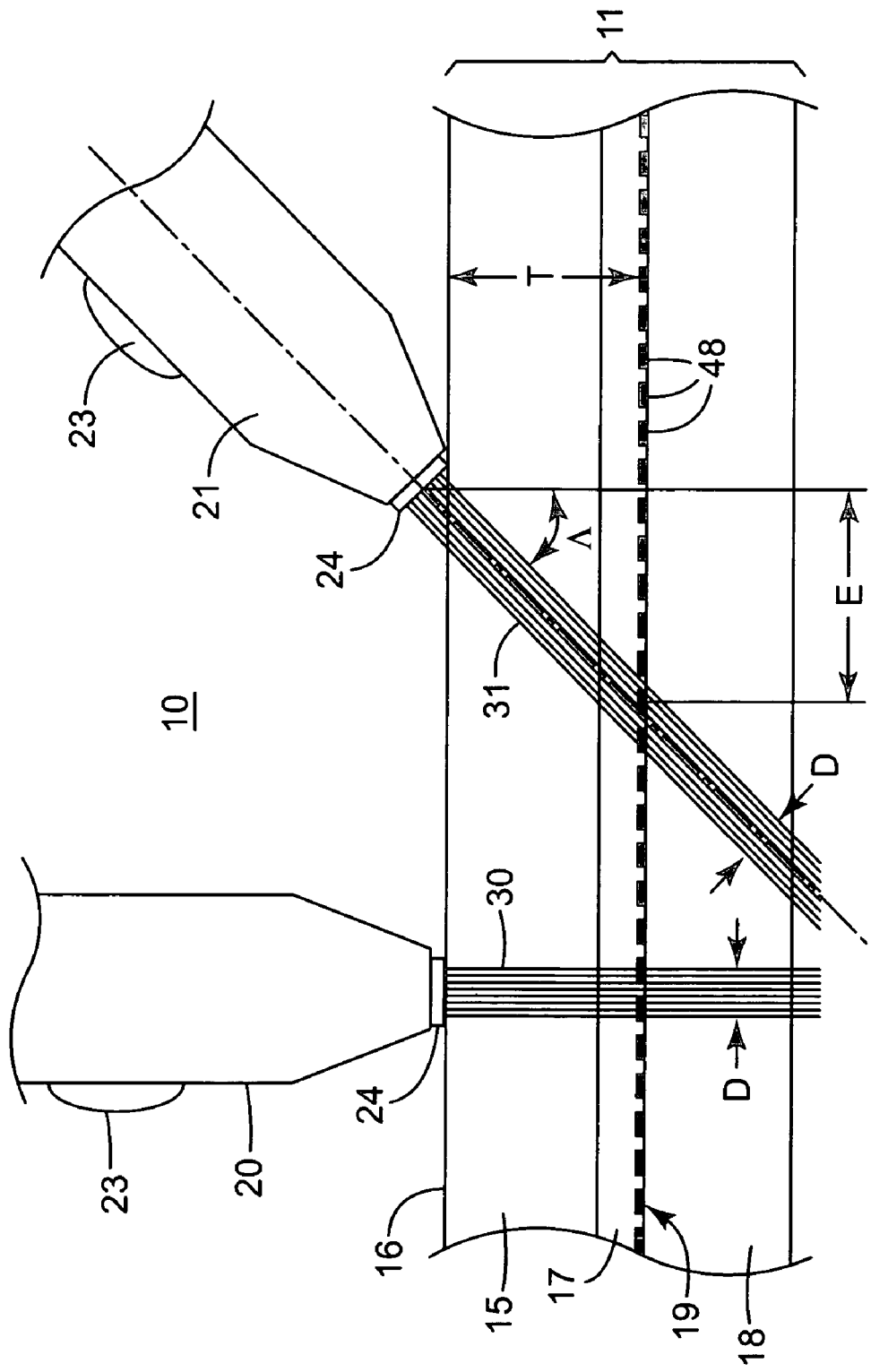
FIG. 1 schematically shows a side view of a user input device used according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to a light emitting stylus, the position and states of which can be measured by an optical digitizer. Light beam size and shape can be adapted to provide accurate, high resolution location determination using an array of light sensors.

The present invention provides a light emitting stylus useful in a user input device, where the stylus can include one or more of the following features. The present invention provides a stylus that emits a light beam having a spot size that is greater than the distance between neighboring adjacent optical sensors to locate the beam at all locations of interest. The present invention provides a stylus that emits a known, varying intensity profile, such as with a slightly defocused light beam having an intensity profile that is brightest at the center and reduces to zero in a known pattern. In using such a stylus, two or more adjacent optical sensors can detect light in an amount proportional to their proximity to the center of the beam, thus allowing interpolation of the location of the beam center resulting in a greater resolution than would be expected given the distance between optical sensors. The present invention provides a system in which the angle of the light beam, and therefore the angle of the stylus, can be measured using the aspect ratio of the beam shape at the plane of the light sensors in comparison with the known aspect ratio of the beam. This angle, and the location of the center of the beam, can be used to locate the position of the stylus. This may be particularly useful when the digitizer surface is a significant distance from the light sensing surface to account and correct for parallax errors. Knowing the position of the stylus, and thus the user's hand, can also be useful for other purposes such as determining where to display information so that it can be seen by the user.

FIG. 1 shows an input device 10 that includes a digitizer 11, which may include an upper substrate 15 having an input surface 16, a lower substrate 18, a photo detector array 19 including detectors 48, and inter-substrate gap 17. Digitizer 11 may also function as a display, for example an active matrix liquid crystal display (AMLCD) where the photo detectors are additionally provided, a liquid crystal display (LCD) where the photo detectors are the pixel transistors of the display, an organic electroluminescent display (OLED) where the light emitting pixels also function as photo detectors, and the like. Examples of digitizers suitable for use in the present invention include those disclosed in the following publications, each of which is wholly incorporated into this document as if reproduced in full: WO 03/071345; WO 03/058588; U.S. Pat. Nos. 6,337,918; 5,838,308; JP 10-187348; JP 10-283113; JP 58-086674; JP 60-198630; JP 60-200388; JP 61-006729; JP 61-075423; JP 11-282628; and JP 2003-66417.

FIG. 1 also shows two identical light emitting styli 20 and 21, each emitting highly focused laser-like beams 30 and 31, respectively. Styli 20 and 21 are a distance T from array 19. Stylus 20 is perpendicular to array 19, and the width of its beam 30 is sufficient to irradiate at least two photo detectors simultaneously. The location of stylus 20 can be determined by measuring the position of the spot of light intersecting with detector array 19 directly below stylus 20. Detection of light beam 30 may be enhanced by modulating beam 30 so the detected signal can be filtered and separated from ambient light or electronic noise. Light beam 30 may be modulated by changing color, intensity, duty cycle, polarization, or pulse width modulation without affecting the position measurement. Such beam modulation may also be used to convey states of the stylus, such as the on/off condition of a tip transducer 24 (e.g., indicating contact of the stylus with the input surface), or side switch 23. These states can be communicated via array 19 to measurement system 213 (see FIG. 8). Uniquely modulated beams from two or more styli may be used to distinguish the styli, for example those used by two or more unique users of a single digitizer.

The side switch 23 and/or the tip transducer 24 can be pressure activated switches that make or break an electrical contact, resulting in a signal. The signal may be a change in stylus beam 30, such as a change in beam intensity, or in the duty cycle of a modulated beam 30, or in frequency of modulation of beam 30, or the color of beam 30, or the polarization of light in beam 30. The change in stylus beam 30 is conveyed via array 19 to measurement system 213 where it may be interpreted as the equivalent of a right or left mouse click, or other change in status of stylus 20.

Side switch 23 may be a capacitive sensing transducer that activates when touch contact is made to the body of stylus 20 and also to an electrically isolated area, identified as switch 23. Tip transducer 24 may be a pressure sensing transducer that outputs a continuously varying signal in response to varying pressure on tip transducer 24. The signal from transducer 24 can cause a change in stylus beam 30, such as a change in beam intensity, or frequency, etc. described above.

Tip transducer 24 may be a mechanical shutter that passes a variable amount of light from a light source in stylus 20 to array 19, depending on the amount of pressure applied to tip transducer 24. Tip transducer 24 may be a light guide in the form of a movable lens or a tube that focuses or guides light to form a variable width beam from a light source in stylus 20 to array 19, depending on the amount of movement of tip 24, resulting from pressure applied to tip transducer 24. Width changes of the beam can be measured as described with respect to FIG. 5.

Referring again to FIG. 1, stylus 21 and its beam 31 are identical to stylus 20 and beam 30, except that stylus 21 is at an angle of Λ degrees with respect to an axis perpendicular to array 19. This angle and the distance T between stylus 21 and array 19 results in a distance E between the point of contact of stylus 21 with surface 16 and the point where light beam 31 intersects with detector array 19. If the location of stylus 21 were measured as the intersection of beam 31 and array 19, the distance E will represent an error. The error E can be measured and corrected if the angle Λ of stylus beam 31 can be measured, and the distance T is known (or can be measured).

Figure 2:
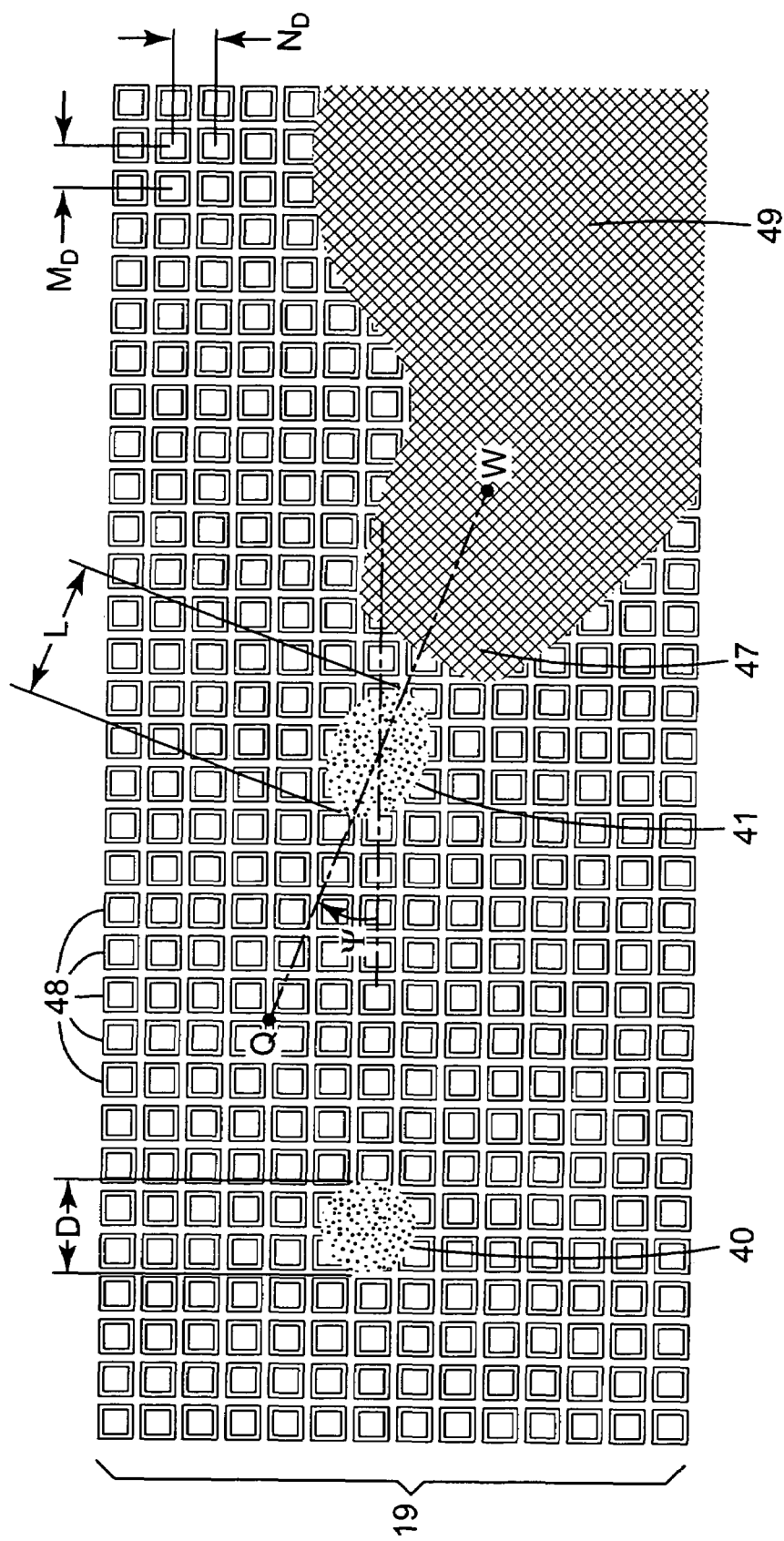
FIG. 2 schematically shows a plan view of the device shown in FIG. 1.

FIG. 2 shows an overhead view of the array 19 of photo detectors 48, spaced center-to-center at a distance $M_D$ horizontally and $N_D$ vertically. As shown, $N_D=M_D$, although this condition need not be the case. The present invention contemplates any array or distribution of light detectors, including linear arrays, hexagonal arrays, rectangular arrays, or any other suitable array or distribution of detectors. FIG. 2 is meant to represent a relatively high detector density such as is typical of OLED displays configured for optical sensing, such as disclosed in WO 03/058588, incorporated herein by reference. Also shown are light spots 40 and 41 irradiated by stylus beams 30 and 31 respectively. A resolution of half the detector array 19 spacing (in this case M/2), can be achieved if a beam irradiates at least portions of two detectors simultaneously in each of the X and Y directions. Each photo detector in array 19 measures multiple levels of light, so interpolation of light levels can be used to locate the position of a spot having a diameter greater than 2M diameter to a resolution finer than the inter-detector distance M. In the case where $N_D$ and $M_D$ are not equal, it may be desirable for the spot diameter to be about equal to or greater than the larger of $N_D$ and $M_D$. While beam spot 40 is shown to be round, it will be appreciated that any spot shape can be used, particularly when the spot shape and intensity distribution are known.

Spot 41 is made by a round beam of light from stylus 21 that is oriented at an angle of Λ degrees from the plane of detector array 19. The resulting spot 41 is an elliptical shape with minimum width D, equal to the diameter of beam 31. The long dimension L of the ellipse is determined by the equation:

$$L = D * \cos \Lambda \qquad \text{(Equation 1)}$$

So Λ can be calculated from L and D;

$$\Lambda = \cos^{-1} D/L \qquad \text{(Equation 2)}$$

A stylus beam angle of 45° results in L=1.41*D. The length to width ratio and orientation of the longer dimension of elliptical spot 41 can thus be used to measure the tilt angle Λ and tilt axis of stylus 21. Given the angle Λ from equation 2 and the known distance T, the magnitude of error E can be calculated by:

$$E = \tan \Lambda * T \qquad \text{(Equation 3)}$$

The magnitude of error E can be calculated from Equation 3. The long axis L of elliptical spot 42, and therefore error E, can be determined directly from sensor array 19 measurements and simple image recognition algorithms. The direction of error E, however, cannot be determined from direct, static measurement. For example, spot 41 may result from a stylus 21 at position Q, or at position W. The actual stylus position can be determined by applying one or more of several methods, examples of which are outlined below.

Stylus 21 will typically be hand held, and thus the tilt angle Λ of stylus 21 will typically be in the direction of the hand or fingers holding the stylus. Since the user and hand are typically oriented toward the bottom of digitizer array 19, it may be assumed that the hand, and (generally) stylus 21 are located nearer to point W than to point Q. This method may be adequate in systems where the orientation of the input device with respect to a user will always be known.

Since digitizer array 19 senses light, hand position may be determined by measuring the shadow 47 cast by stylus 21 and the hand or fingers, relative to light spot 31. A shadow 49 to the right of spot 31 (as shown in FIG. 1), indicates that stylus 21 is located nearer to point W than to point Q. This method may be adequate in systems where there is sufficient ambient light to cast a shadow from the stylus or the hand.

It is also possible to infer the hand location based on spot movements. In normal writing, few strokes (especially straight strokes) are made by pushing the stylus in the direction it is pointing. Most strokes will be made sideways or by pulling the stylus tip in the direction the stylus is tilted. Thus, a recent history of relative beam locations can be used to determine hand position.

A further method includes prompting the user to indicate hand position and/or device orientation prior to user inputs being made.

Figure 5:
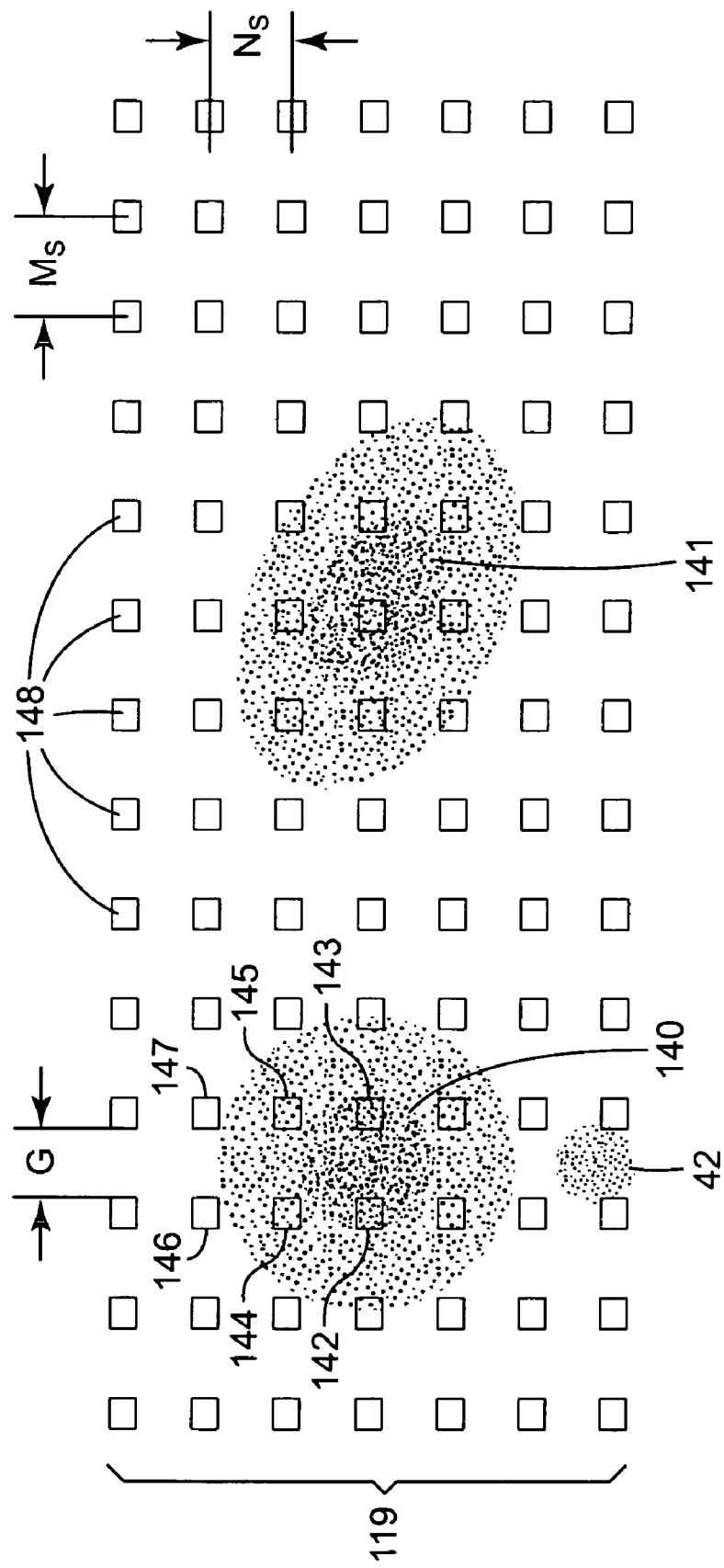
FIG. 5 schematically shows a plan view of the device shown in FIG. 3.
Figure 7:
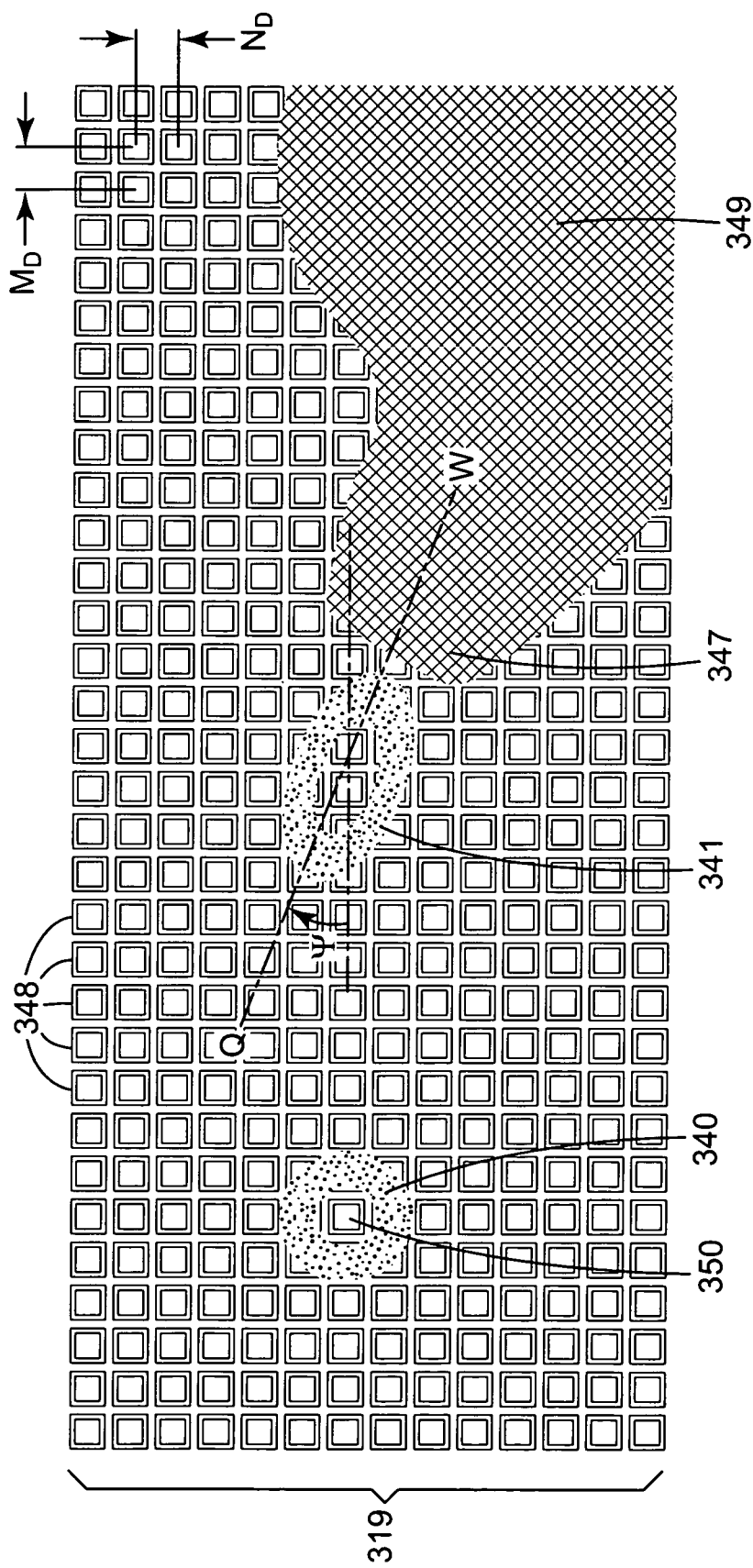
FIG. 7 schematically shows a plan view of the device shown in FIG. 6.

A further method of determining stylus orientation includes additional analysis of the light distribution of the spot formed on the detectors. Without loss of generality, in the case in which a light beam having a know cross-sectional intensity distribution, such as a Gaussian light distribution or a conical light distribution, illuminates the sensor array at an angle, an elliptical spot will be formed such as spot 41 in FIG. 2 (and, analogously, as shown in FIGS. 5 and 7 with respect to spots 141 and 341, respectively). The elliptical spot will generally exhibit an intensity distribution such that the half of the spot oriented toward the stylus tilt direction will have a higher integrated intensity than the half of the spot oriented away from the stylus tilt direction. As such, comparing the integrated intensity contribution from different halves, quadrants, or other selected sections of the spot can be used to indicate stylus tilt direction.

In addition to aiding positional error corrections, hand and stylus position information can be used for other purposes. For example, when popping up a menu or other information on the display, it may be desirable to position the information where its viewing is unlikely to be blocked by the stylus or hand. As another example, in multiple user systems, the determined position and orientation of the stylus can be used to determine which user is inputting the information.

Figure 3:
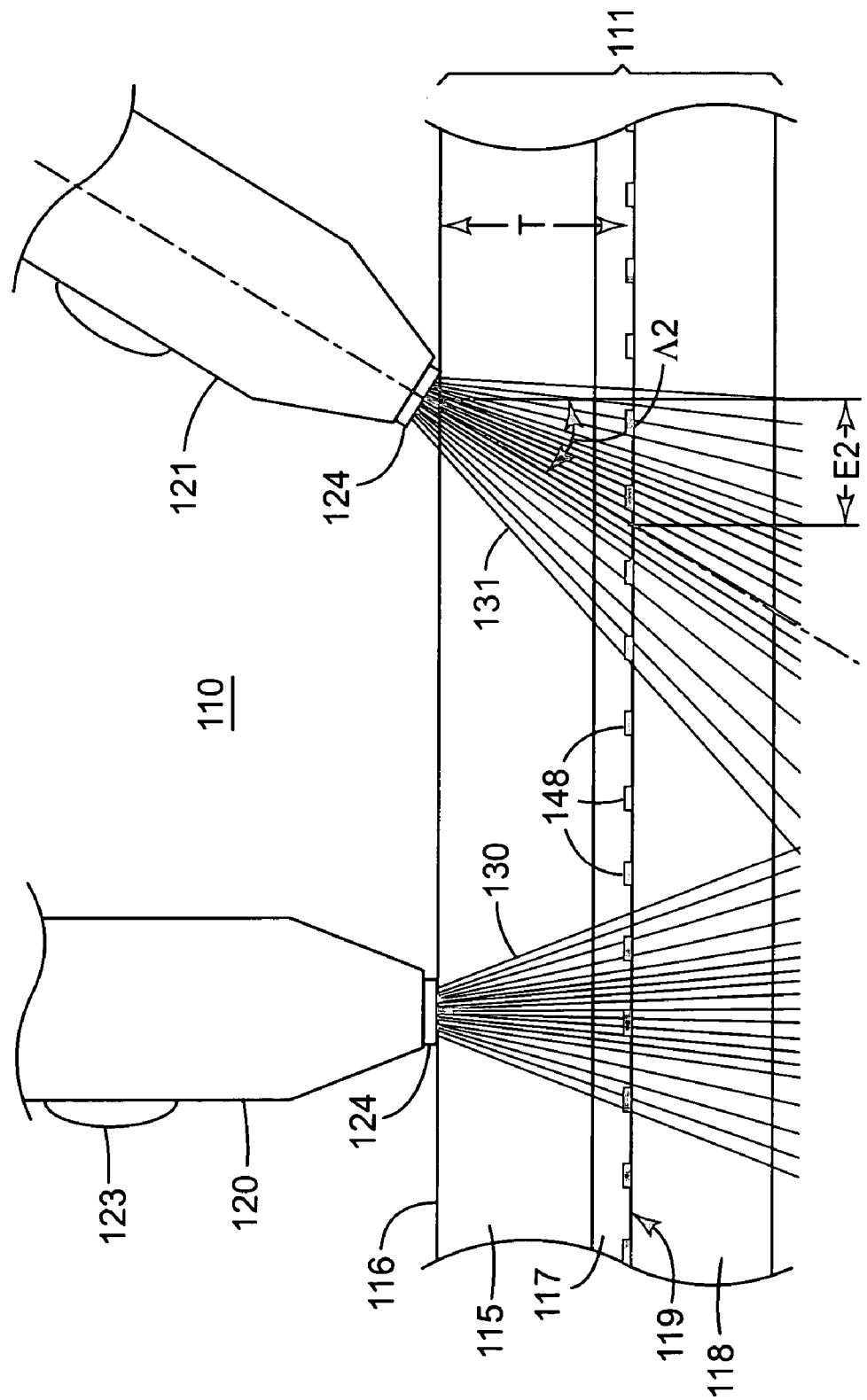
FIG. 3 schematically shows a side view of another user input device used according to the present invention.

FIG. 3 shows an input device 110 similar to device 10 shown in FIG. 1, except that styli 120 and 121 emit conical beams, spreading light in spot patterns over a wider area. Also, sensor array 119 has fewer detectors 148 that are more widely spaced, as may be the case where the photo detectors 148 are part of a photo-sensitive LCD, as disclosed in International Publication WO 03/071345, which is hereby incorporated by reference. In a sparse array such as 119, a wider beam with a known varying intensity across its axis has advantages as discussed below.

Figure 4A:
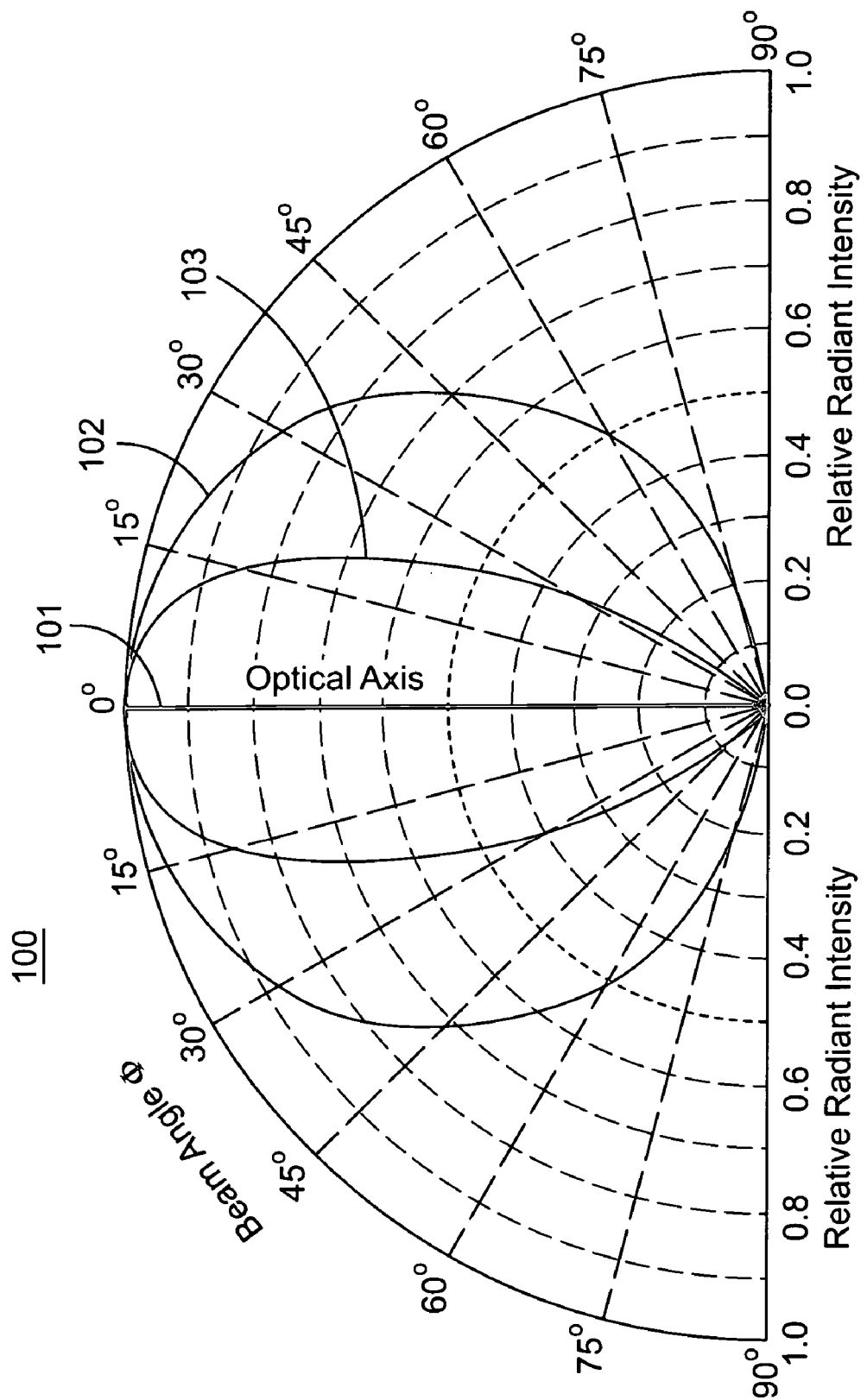
FIG. 4(a) shows intensity profiles of various representative light beams.
Figure 4B:
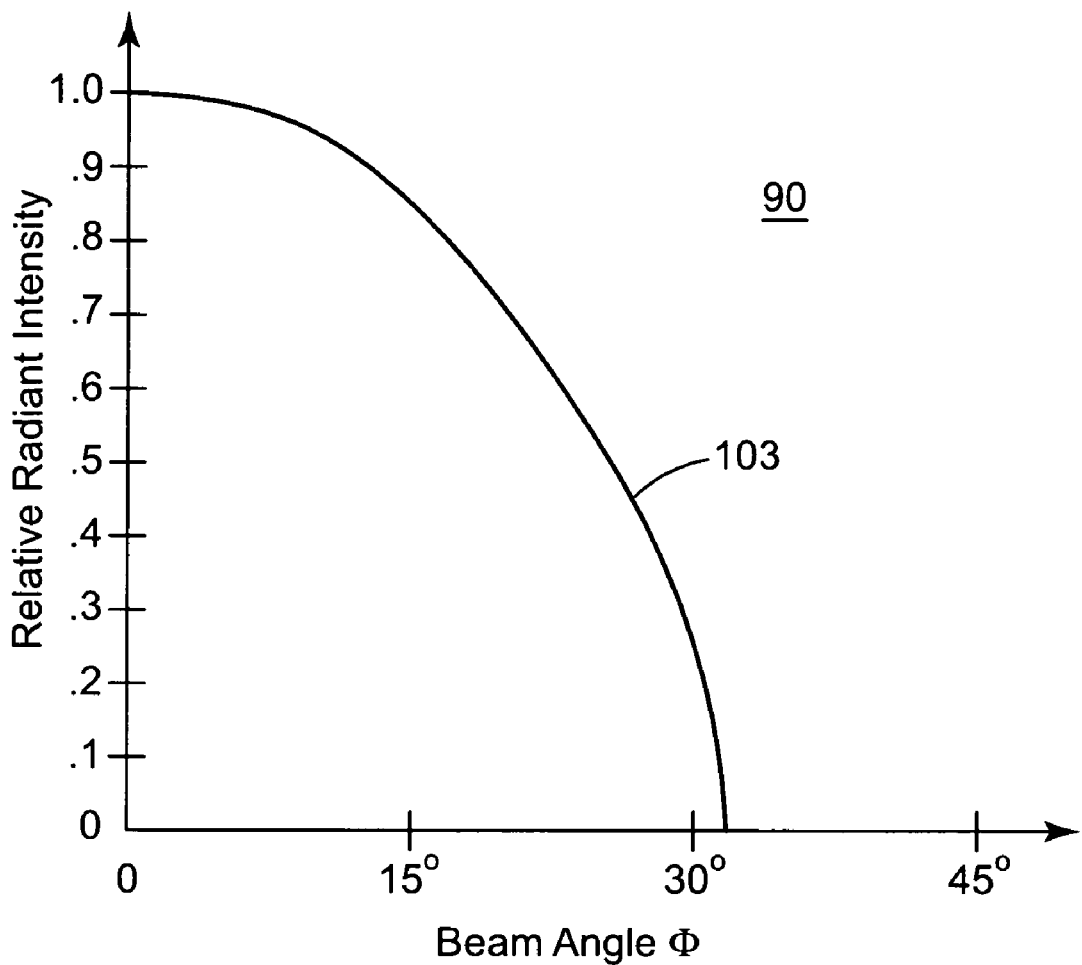
FIG. 4(b) shows the cross-sectional beam intensity profile of one of the light beams indicated in FIG. 4(a)

FIGS. 4(*a*) and (*b*) can be used to demonstrate various representative beam intensity profiles. FIG. 4(*a*) shows chart 100, with light distributions of several light beams shown. The distribution of radiant intensity around a light source (e.g. an LED) is referred to as the beam angle Φ. The maximum radiant intensity is on the optical axis. This is generally reduced as the angle Φ to the optical axis increases. The range of the optical angle within which the radiant intensity is greater than or equal to 50% of the maximum value is referred to as the half intensity value.

Referring to graph 100, line 101 results from a sharply focused laser-like beam with a half intensity angle near zero. Line 102 is typical of an unfocused, planar type LED, with a half intensity angle of +/−60°. Line 103 may be achieved with a parabolic lens on an LED, resulting in a half intensity angle of +/−25°. Graph 90 in FIG. 4(*b*) shows another view of line 103, the relative radiant intensity of a light source with half intensity angle of 25°. Such a known beam intensity profile can be used as described in discussions that follow.

Referring back to FIG. 3, consider that the beam of stylus 120 has the radiant versus angle as indicated by profile 103 in FIGS. 4(*a*) and (*b*). This results in light distribution onto array 119 that varies with distance from a maximum light at the beam 130 center, reducing with distance from the center in a known way. When used with a sparse array such as array 119, this light distribution has several advantages over highly focused beams 30 and 31, shown in FIG. 1. Because the intersection of beam 130 with array 119 is wider, the light irradiates several detectors 148 even though their spacing is wide. The light distribution has a defined pattern, which may be used to more accurately interpolate between widely-spaced detectors 148. Also, changes in distance between stylus 120 and array 119 will result in a change in width of the intersection of beam 130 and array 119 that may be detected. This may allow stylus 120 height (distance from array 119) to be measured.

FIG. 5 shows a top view of array 119 and light spots 140 and 141 irradiated by stylus beams 130 and 131, respectively. Inter-detector spaces are $M_S$ horizontally and $N_S$ vertically, where $M_S=N_S$. G represents the width of the minimum gap between adjacent photo detectors 148. Spot 42 is an example of a spot that might be made by a small diameter, more sharply focused laser-like beam. If spot 42 diameter is less than or equal to the inter-detector gap G (as shown), it can be located by detectors in array 119 with a resolution determined by the inter-detector distance M. If spot 42 diameter is greater than the inter-detector gap G, it can be measured simultaneously by two detectors 140, and interpolation can be used to locate spot 42 with a resolution of M/2. The inter-detector spacing M of sparse array 119 may be greater than 1 mm, so a resolution of M/2 would be marginal for some stylus applications such as writing. Therefore a wider, variable-intensity spot like 140 can be generated so interpolation can be used more effectively.

Referring again to FIGS. 3 and 5, consider spot 140 having a light distribution as defined by profile 103 shown in FIGS. 4(*a*) and (*b*), and spot 140 is centered half way between detectors 142 and 143. Given M=N=1 mm, and T=3 mm, detectors 142 and 143 will receive about 0.94 of the maximum light transmitted to the plane of the detectors. Detectors 144 and 145 will receive about 0.66 of maximum, or 70% as much as detectors 142 and 143. Detectors 146 and 147 will receive virtually no light. These light intensities and intensity differences among adjacent detectors allow high resolution interpolation between the detectors in that the beam intensity profile and overall shape are known and can be compared to the detected signals. The detected signals can be mapped onto the known profile and shape to pinpoint the location of the center of the beam.

Elliptical spot 141 results from stylus 121, at an angle Λ2 with respect to array 119. Length to width ratios can be used to calculate the orientation and angle of stylus 121, and the error E2, using methods similar to those described above in terms of stylus 21 and elliptical spot 41. Error E2 may also be further analyzed. A beam with light distribution as defined by profile 103 will distribute light with half of total irradiation on either side of the optical axis (and stylus axis). The irradiation falling in the direction of stylus tilt will fall in a smaller area that spans length E2, while the irradiation on other side of the optical axis will cover a larger area. The total illumination in the region of spot 141 collected by detectors 148 may be analyzed to determine the location of the optical axis, based on a 50%/50% distribution. Alternatively, the optical axis may be located by comparing the measured light distribution of spot 141 versus the known light distribution profile (e.g., profile 103 in FIG. 4(b)).

Figure 6:
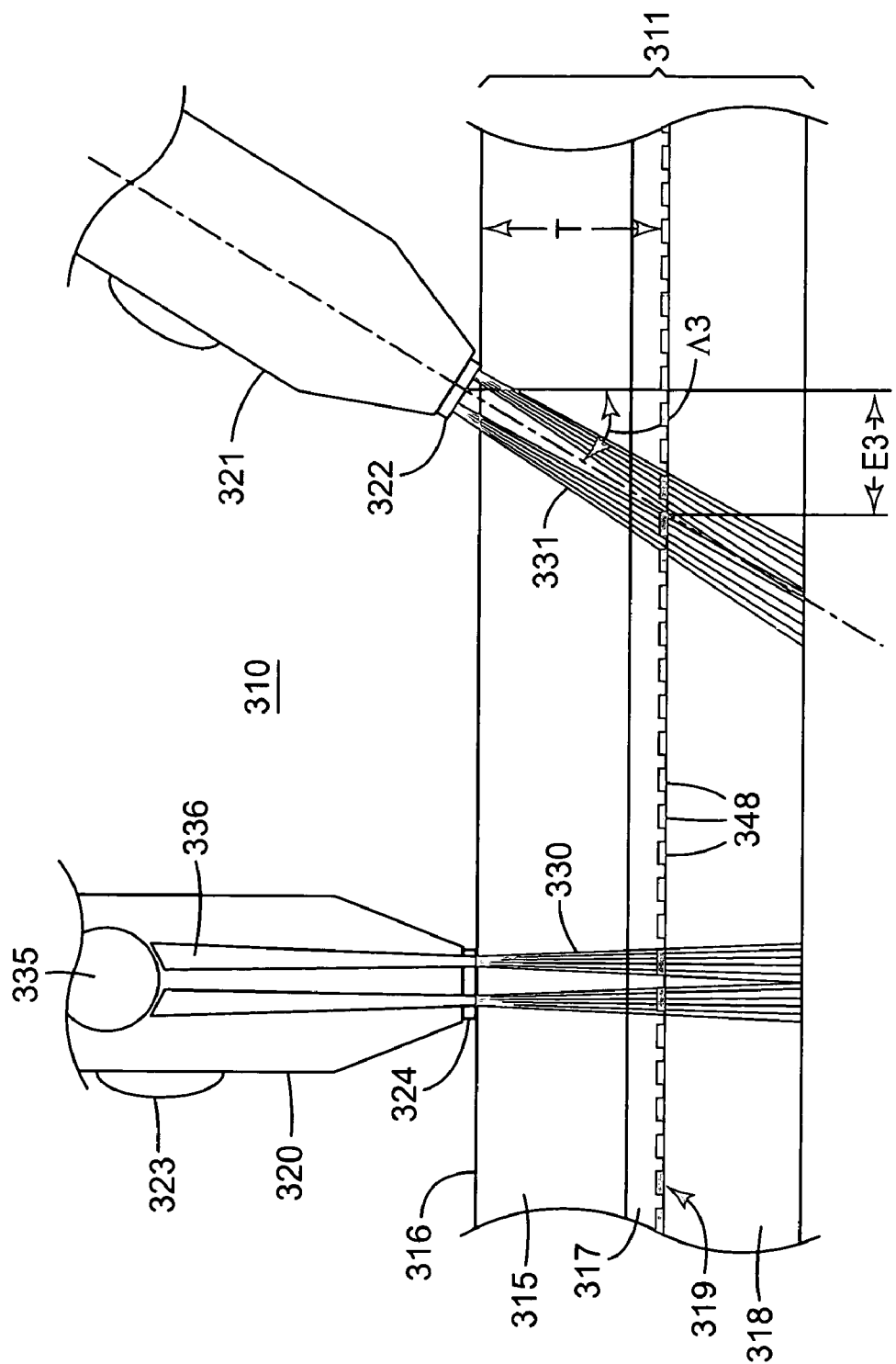
FIG. 6 schematically shows a side view of another user input device used according to the present invention.

FIG. 6 shows an input device 310 including digitizer 311. Two identical light emitting styli 320 and 321 are also shown, each emitting focused beams 330 and 331 with an annular beam pattern. Stylus 320 is shown in cross section, showing internal light source 335, and the cross section of tubular shaped light guide 336, which carries light from source 335 through tip 324, focusing it into an annular pattern of light. Stylus 321 projects a similar light pattern at an angle Λ3.

FIG. 7 shows an overhead view of array 319 of photo detectors 348. Also shown are ring shaped light spots 340 and 341 irradiated by stylus beams 330 and 331, respectively. The ring-shaped spot 340 has the advantage that it can be formed of a relatively highly focused beam while exhibiting high contrast in light level, and thus in signal, between adjacent detectors. This contrast can be detected on both the inner and outer edges of the ring. For example, detector 350 will detect low light, while the eight nearest neighbor detectors adjacent to 350 will detect higher light levels, and the next group of detectors outward from the eight detectors will detect low light. Image detection algorithms can be used to resolve the stylus location with high resolution. The height of stylus 330 may also be measured using a ratio of ring diameter to center (unlit) diameter. The tilt angle and axis of elliptical ring shaped spot 341 can be determined as described above for spot 41 in FIG. 2.

Hand shadow 349 and stylus shadow 347 can be used to determine the tilt angle Λ of stylus 321. In situations where spot contrast is low, shadows 349 and 347 can also be used in conjunction with spot 341 to locate the stylus.

The spot intensity profiles shown and discussed are illustrative and not meant to be limiting. Other known, varied spot intensity profiles can be used in addition to those shown in the drawings, and are fully contemplated for use with the present invention as will be appreciated by those of skill in the art from the description provided in this document. The techniques for spot location determination and enhanced resolution, beam angle determination, stylus orientation determination, and so forth, as described are directly applicable to any spot intensity profile having characteristics detectable by light sensor arrays useful in the present invention.

Figure 8:
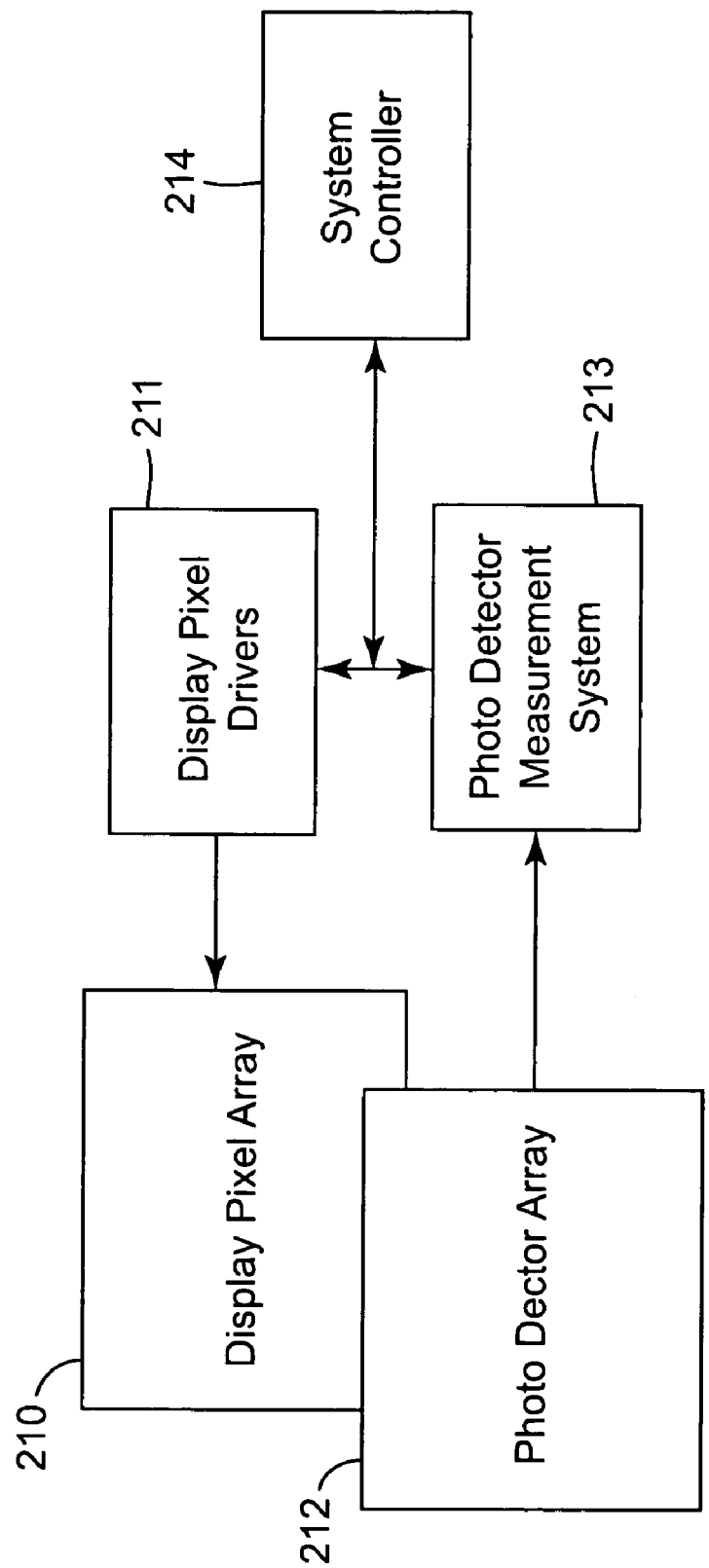
FIG. 8 shows a block diagram of a user input system of the present invention.

FIG. 8 shows a block diagram of a display system with a photo detector array. Generally, the display pixel array 210 and the photo detector array 212 are co-located as described in published U.S. Patent Application US 2003/0122749 and in International Publication WO 03/071345, each of which is hereby incorporated into this document as if reproduced in full. Pixel drivers 211 and the photo detector measurement system 213 may also be integrated into the same semiconductor device(s), and may be in communication with system controller 218. Display pixel drivers 211 are known in the art. Photo detector measurement system 213 can measure the amount of light irradiating each detector in display pixel array 210. It may also be able to measure ambient light and to discriminate between ambient light and shadows. A system controller calculates display information to be sent to pixel drivers 211, and also calculates the position of light patterns on photo detector array 212, measured by photo detector measurement system 213.

Figure 9:
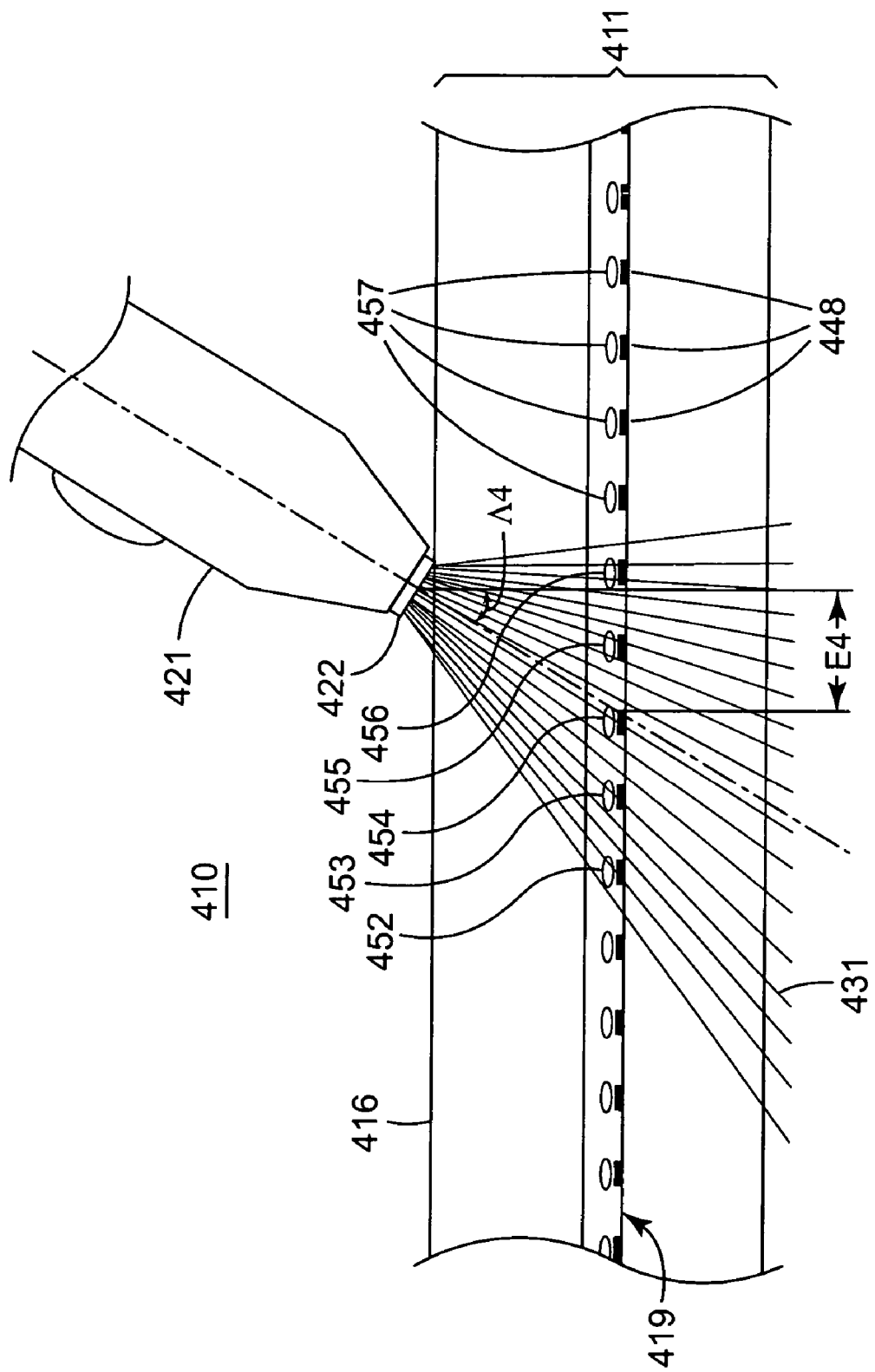
FIG. 9 schematically shows a side view of another user input device used according to the present invention.

FIG. 9 shows a cross sectional view of system 410 with digitizer 411 having detector array 419. Each detector 448 in array 419 has an associated lens, for example lenses 452, 453, 454, 455, 456, and 457, in its optical path. A similar lens arrangement is disclosed in U.S. Pat. No. 6,028,581, which is incorporated by reference herein. Lenses 452 through 457 focus light from above digitizer 411 such that each detector in array 419 receives light nominally perpendicular to array 419, through a column equal in diameter to lenses 452 through 457. Light 431 from stylus 421 is spread in a wide angle, for example 170 degrees, so it is spread across many detectors, and may strike the detectors at various angles as indicated in FIG. 9. Lenses 452 through 457 convey perpendicular light to their respective detectors, so only the light impinging on lenses 455 and 456 would be focused onto any detectors. Thus, the error E4 between the tip location of stylus 421 and the center of its emitted light spot, due to angle Λ4 of the stylus, can be reduced.

A lens above each detector in array 419 can also increase the contrast of light and shadows received by detectors in array 419, because light impinging on surface 416 of digitizer 411 at oblique angles will be refracted by the lenses away from detectors in array 419. This is particularly important where shadows, such as those cast by the stylus or hand as described in this document, are used to locate stylus and/or touch positions.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A light-sensitive user input device comprising:
   a co-planar array of light-sensitive devices disposed to sense light transmitted through an input surface of the input device, nearest adjacent light-sensitive devices having a center-to-center spacing of no more than a maximum distance;
   a stylus configured to emit a light beam detectable by the devices, the light beam exhibiting a cross-sectional profile having a known shape characterized by a known intensity variance across the beam profile, wherein the light beam exhibits a size at the plane of the devices that is greater than the maximum distance when the stylus is contacting the input surface; and
   electronics coupled to the light-sensitive devices and configured to determine the position of the light beam to within a spacing that is less than the maximum distance using the known intensity variance of the beam profile.

2. The user input device of claim 1, wherein the electronics are configured to determine the position of the light beam using interpolation methods based on the known intensity variance of the cross-sectional profile of the light beam.

3. The user input device of claim 1, wherein the cross-sectional profile of the light beam has a circular shape, and the detectable size is the diameter of the circular shape.

4. The user input device of claim 1, wherein the cross-sectional profile of the light beam has an elliptical shape, and the detectable size is an axis of the elliptical shape.

5. The user input device of claim 1, wherein the known intensity variance comprises a beam intensity that is highest at the beam center and that continuously trails off to zero intensity away from the beam center.

6. The user input device of claim 1, wherein the known intensity variance comprises an annular beam intensity profile that increases in intensity from the center of the beam to a maximum intensity away from the beam center and then trails off to zero intensity with further distance away from the beam center.

7. The user input device of claim 1, wherein the electronics are further configured to determine beam angle.

8. The user input device of claim 7, wherein the beam angle is determined by comparing a measured shape of the beam as detected by the light-sensitive devices to the known shape of the beam.

9. The user input device of claim 1, wherein the electronics are further configured to detect stylus tilt direction.

10. The user input device of claim 9, wherein the stylus tilt is determined by detecting a shadow cast on the devices attributable to the stylus or an object holding the stylus.

11. A method of determining the position of a light beam at an input surface, comprising:

providing a co-planar array of light-sensitive devices disposed to sense light transmitted through the input surface;

emitting the light beam with a known shape characterized by a cross-sectional profile having a known intensity variance, the light beam having a spot size sufficient for the light beam to be detected by at least two of the light-sensitive devices when the light beam is directed through the input surface;

detecting the light beam by at least two of the light-sensitive devices; and determining the position of the light beam to an accuracy that is less than the center-to-center distance between nearest adjacent light-sensitive devices by interpolating signals measured during the detecting step using the known intensity variance of the light beam.

12. The method of claim 11, further comprising the step of determining beam angle from comparing a detected light beam shape to the known shape.

13. The method of claim 12, further comprising the step of determining beam tilt orientation by using the light-sensitive devices to detect a reduced light intensity that is attributable to a shadow cast by a device emitting the light beam or by an object holding the device emitting the light beam.

* * * * *